Jan. 9, 1923.
E. V. HARTFORD.
SPRING RETARDING DEVICE.
FILED SEPT. 25, 1918.
1,441,578.
2 SHEETS—SHEET 1.
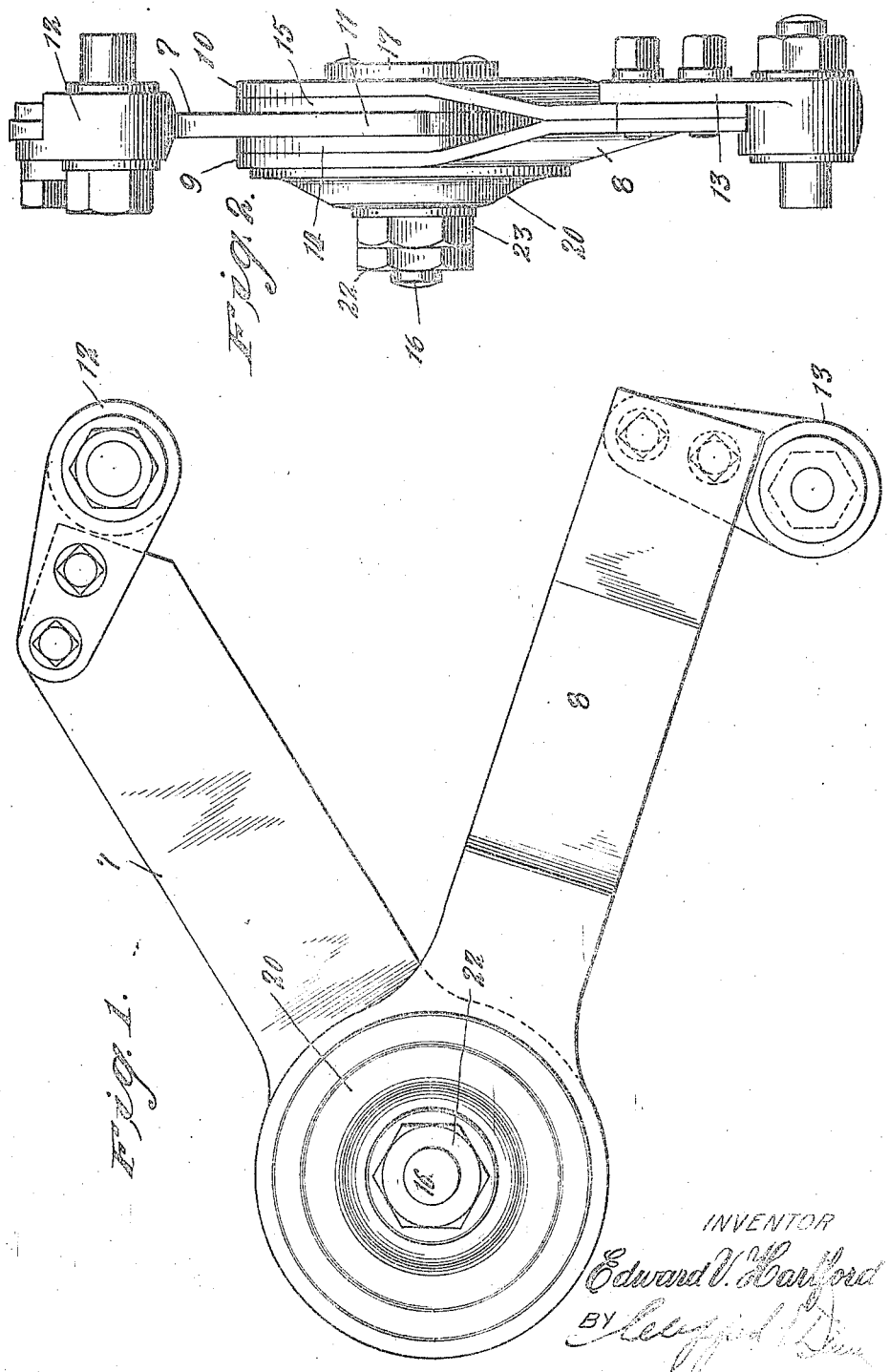
INVENTOR
Edward V. Hartford
BY
ATTORNEY Jan. 9, 1923. 1,441,578.
E. V. HARTFORD.
SPRING RETARDING DEVICE.
FILED SEPT. 25, 1918.
2 SHEETS—SHEET 2.
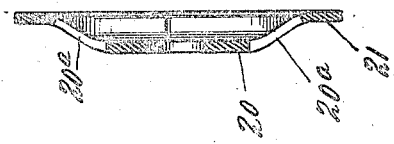
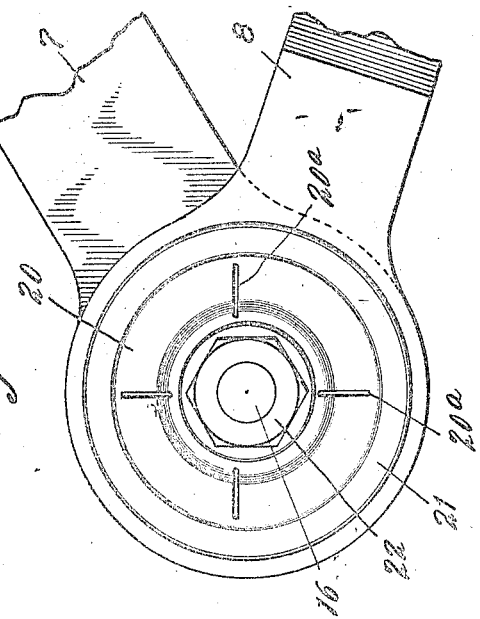
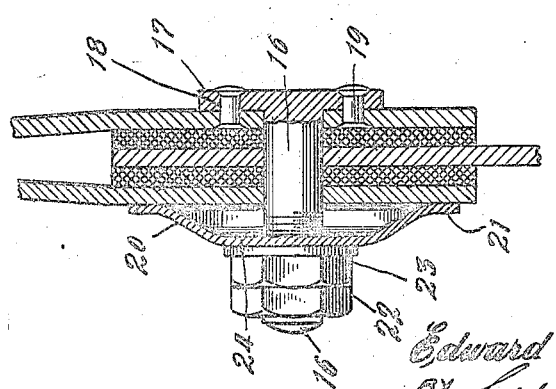
INVENTOR
Edward V. Hartford
BY
ATTORNEY Patented Jan. 9, 1923.

1,441,578

UNITED STATES PATENT OFFICE.

EDWARD VASSALLO HARTFORD, OF DEAL, NEW JERSEY, ASSIGNOR TO EDWARD V. HARTFORD, INC., OF NEW YORK, N. Y., A CORPORATION OF NEW YORK.

SPRING-RETARDING DEVICE.

Application filed September 25, 1918. Serial No. 255,707.

*To all whom it may concern:*

Be it known that I, EDWARD VASSALLO HARTFORD, a citizen of the United States, residing at Deal, in the county of Monmouth and State of New Jersey, have invented certain new and useful Improvements in Spring-Retarding Devices, of which the following is a specification.

The present invention relates to improvements in spring retarding devices and is more especially directed to a so-called shock absorber or anti-vibration device for vehicles having spring suspension of the general type described in my copending application for Letters Patent of the United States, filed May 2nd, 1913. Serial No. 765,071.

In the aforesaid application, I have illustrated and described a shock absorber or anti-vibration device adapted to modify the action of the spring suspension means of a vehicle, when subjected to violent shocks and rebounds due to undulations or irregularities in the road bed being traversed, this being accomplished by what is known as a friction device which is made up or composed of a plurality of elements so constructed and assembled, as to retard the action of the vehicle springs.

In order to maintain the friction elements in functioning relation to each other, I have disclosed in my co-pending application a so-called spider or star spring which bears upon one of the friction elements, and has means associated therewith to vary the tension of the arms, so as to increase or decrease the pressure between the friction elements to permit of the employment of the device in connection with spring suspensions having different degrees of flexibility.

I have found in practice that in some instances it is desirable to have a more positive pressure exerted upon the friction elements, than is obtained by the use of the spider or star spring, and the object of the present invention, therefore, is to provide a means whereby pressure will be exerted upon the friction elements, in such a manner as to maintain the entire areas of their operative surfaces in constant frictional contact.

My invention is further directed to an anti-vibration device or shock absorber of the general structure heretofore set forth, wherein a greater range of adjustability may be obtained, and in which the manufacture and assembly of the parts will be simplified and rendered more economical.

Other objects and advantages of my present invention will become manifest as the description proceeds, and I would have it understood that I do not limit myself to the details of structure shown, or the specific functions and uses pointed out, reserving unto myself the full range of equivalents thereof, to which I may be entitled under my invention in its broadest aspect.

I shall proceed to describe my invention with reference to the accompanying drawings, wherein I have elected to show one embodiment thereof, to afford a clear and comprehensive understanding of its structure and objects, and then point out more particularly the essential elements of novelty in the appended claims.

In the drawings:

Fig. 1 represents a side elevation of a spring retarding device, embodying my invention.

Fig. 2 is the end elevation of the structure shown in Fig. 1.

Fig. 3 is a view in cross section of the frictional elements and a means for holding them in operative engagement.

Fig. 4 is a fragmentary elevation of the structure shown in Fig. 1 illustrating a modified form of the means employed for maintaining the friction elements in close association, and Fig. 5 is a sectional view of the means referred to in Fig. 4.

Referring now to the drawings in detail in which like characters of reference are employed to designate similar parts throughout the several views, 7 and 8 indicate the supporting arms of the device, each of which is formed with enlarged annular portions 9, 10 and 11, at one end, the other ends of said arms being adapted for connection to relatively movable parts of a vehicle at 12 and 13. The arm 8 is preferably of a bifurcated or forked construction and the enlarged portions 9 and 10 thereof form friction surfaces to contact with the washers or discs 14 and 15, which may be made of fibre, wood or any other suitable friction material and between which is disposed the enlarged surface 11 of the arm 7. These members 9, 10, 11, 14 and 15 are centrally apertured and are assembled on a bolt or stud 16, the said bolt or stud having an enlarged head 17 which abuts against the outer surface of the enlarged portion 10 of the arm 8, the said head being fixed to the said enlarged portion, so as to be movable therewith by means of the pins or rivets 18 and 19, passing through said head and seated in said portion 10. (See Fig. 3.)

As previously stated, the bolt or stud 16 extends through the apertures in the elements 9, 10, 11, 14 and 15, the end thereof projecting beyond the plane of the outer surface of the enlarged portion 9 of the arm 8. Positioned on the projecting end of the said stud 16 is a preferably cup shaped washer 20 of resilient or non-resilient material, as may be desired, which is preferably formed so as to provide a substantially flat surface 21 at its lower edge, this surface lying in contact with the outer surface of the enlarged portion 9 of the arm 8.

When the securing nuts 22 and 23 in threaded engagement with the projecting end of the stud 16 are tightened up, it will be obvious that the cup shaped washer 22 will be pressed into engagement with the surface of the enlarged portion 9 of the arm 8, the continued tightening of the nuts pressing upon the head portion 24 of said washer, causing the latter by reason of its formation to press all of the frictional elements disposed between the head of the stud 16 and the enlarged portion 9 of the arm 8 into positive contact over their entire abutting surfaces.

By the employment of the washer 20, I obtain a constant degree of friction between the entire areas of the contacting surfaces and the friction elements, regardless of the movement of the supporting arms 7 and 8. This is advantageous in minimizing wear on the friction surfaces, thereby eliminating repairs and replacements, while at the same time, it adds greatly to the efficiency of the entire structure in performing its function.

In the structure shown in Figs. 4 and 5, I have shown the washer 20 formed with elongated slots or openings 20ª cut in the surface thereof whereby the flexibility of the washer is increased.

In the practice of my invention it is desirable to employ a washer of the type shown at 20 made of spring metal by reason of the greater range of adjustability that may be obtained thereby, but in some instances, or if conditions so require, efficient operation of the spring retarding device may be obtained by a washer made of nonresilient material, the variation in the degree of friction between the friction surfaces being effected by tightening or loosening the securing nuts 22 and 23 on the stud 16.

While I have described my invention with reference to the specific structure shown in the drawings, it is obvious changes in the details thereof may be made without departing from the scope and spirit of my invention.

Having thus described my invention what I claim as new and desire to secure by Letters Patent of the United States, is:

1. The combination with a spring retarding device embodying a plurality of flat friction elements and means for maintaining said elements in alignment, of means mounted on said aligning means for maintaining the opposed surfaces of said friction elements in constant contact, said means comprising a centrally apertured cup-shaped member of resilient material having a plurality of radially disposed slots in the wall thereof, and an uninterrupted flattened circumferential portion adapted to bear upon the surface of the contiguous friction element in a zone adjacent to the periphery thereof, and means operative upon said cup-shaped member to effect a change in the pressure between said friction elements, the cup-shaped member maintaining such pressure substantially uniform.

2. The combination with a spring retarding device embodying a plurality of flat friction elements and means for supporting said elements in axial alignment, of means mounted on said aligning means for maintaining the opposed surfaces of said friction elements in constant contact, said means comprising a cup-shaped member of spring metal having an uninterrupted flattened circumferential portion adapted to bear upon the surface of the contiguous friction element in a zone adjacent to the periphery thereof, whereby all of said elements will be held under pressure and a uniform degree of friction will be constantly maintained there-between.

3. The combination with a spring retarding device embodying a plurality of flat friction elements and a stud passing through said elements to support the same in axial alignment, of means for maintaining all of said elements in cooperative relation, said means including a cup-shaped washer of resilient material mounted on said stud and formed with a continuous flattened circumferential portion adapted to bear upon the surface of the contiguous friction element in a zone adjacent to the periphery thereof, and an element adjustable upon said stud to contact with and vary the tension of said washer whereby a predetermined degree of friction may be constantly maintained between said friction elements throughout their entire contacting surfaces.

EDWARD VASSALLO HARTFORD.